(12) United States Patent
Kondo

(10) Patent No.: US 12,049,851 B2
(45) Date of Patent: Jul. 30, 2024

(54) CONTROL DEVICE FOR HYBRID SYSTEM

(71) Applicant: DENSO CORPORATION, Kariya (JP)

(72) Inventor: Takahiro Kondo, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/498,692

(22) Filed: Oct. 31, 2023

(65) Prior Publication Data

US 2024/0084754 A1    Mar. 14, 2024

Related U.S. Application Data

(63) Continuation of application No. PCT/JP2022/019297, filed on Apr. 28, 2022.

(30) Foreign Application Priority Data

May 11, 2021    (JP) ................................ 2021-080567

(51) Int. Cl.
*F02D 41/14*    (2006.01)
*F02D 41/00*    (2006.01)
*F02D 41/30*    (2006.01)

(52) U.S. Cl.
CPC ..... *F02D 41/1475* (2013.01); *F02D 41/0002* (2013.01); *F02D 41/3064* (2013.01)

(58) Field of Classification Search
CPC .... F02D 41/00; F02D 41/0002; F02D 41/007; F02D 41/0275; F02D 41/71; F02D 41/14; F02D 41/1475; F02D 41/3064; F02D 41/307; F02D 2250/21; F02D 2250/36; B60W 10/06; B60W 10/08; B60W 20/00; B60W 20/15; B60W 20/16; B60W 2510/0619; B60W 2540/04; B60W 2710/0622; B60W 2710/0677; B60K 6/24; B60K 6/445; B60L 11/123; B60L 11/14; B60L 15/20; B60L 2210/40; B60L 2240/421; B60L 2240/441;

(Continued)

(56) References Cited

U.S. PATENT DOCUMENTS 5,850,815 A * 12/1998 Yano ................... F02D 41/0002
                                          123/406.47
11,686,263 B1 * 6/2023 Magner ................. F01N 3/2073
                                          60/274

(Continued)

FOREIGN PATENT DOCUMENTS

JP      2019025986 A    2/2019
JP      2019043347 A    3/2019

*Primary Examiner* — John Kwon
*Assistant Examiner* — Johnny H Hoang
(74) *Attorney, Agent, or Firm* — Nixon & Vanderhye P.C.

(57)    ABSTRACT

When switching an operation state of an engine in a hybrid system from a lean burn operation to a stoichiometry operation, the lean burn operation is once switched to a rich operation and then switched to the stoichiometry operation. During a period from before switching to the rich operation to after switching to the rich operation, an intake air restriction for restricting an amount of intake air to the engine is performed. As a result, the amount of intake air is made smaller than when the intake air restriction is not performed. Further, during the period in which the intake air restriction is performed before switching to the rich operation, a fuel cut for cutting fuel to the engine is performed.

9 Claims, 9 Drawing Sheets

(58) Field of Classification Search
CPC ......... B60L 2240/443; B60L 2240/445; B60L 2270/145; Y02T 10/12; Y02T 10/22; Y02T 10/62; Y02T 10/6217; Y02T 10/6239; Y02T 10/6286; Y02T 10/6295; Y02T 10/645; Y02T 10/7077; Y02T 10/7241; Y02T 10/7275
See application file for complete search history.

(56) References Cited

U.S. PATENT DOCUMENTS

| | | | |
|---|---|---|---|
| 2016/0376974 A1* | 12/2016 | Hayashita | F02D 41/1495 60/276 |
| 2019/0078490 A1* | 3/2019 | Lee | F01N 3/0814 |
| 2020/0180630 A1* | 6/2020 | Kaneko | B60W 10/06 |

* cited by examiner

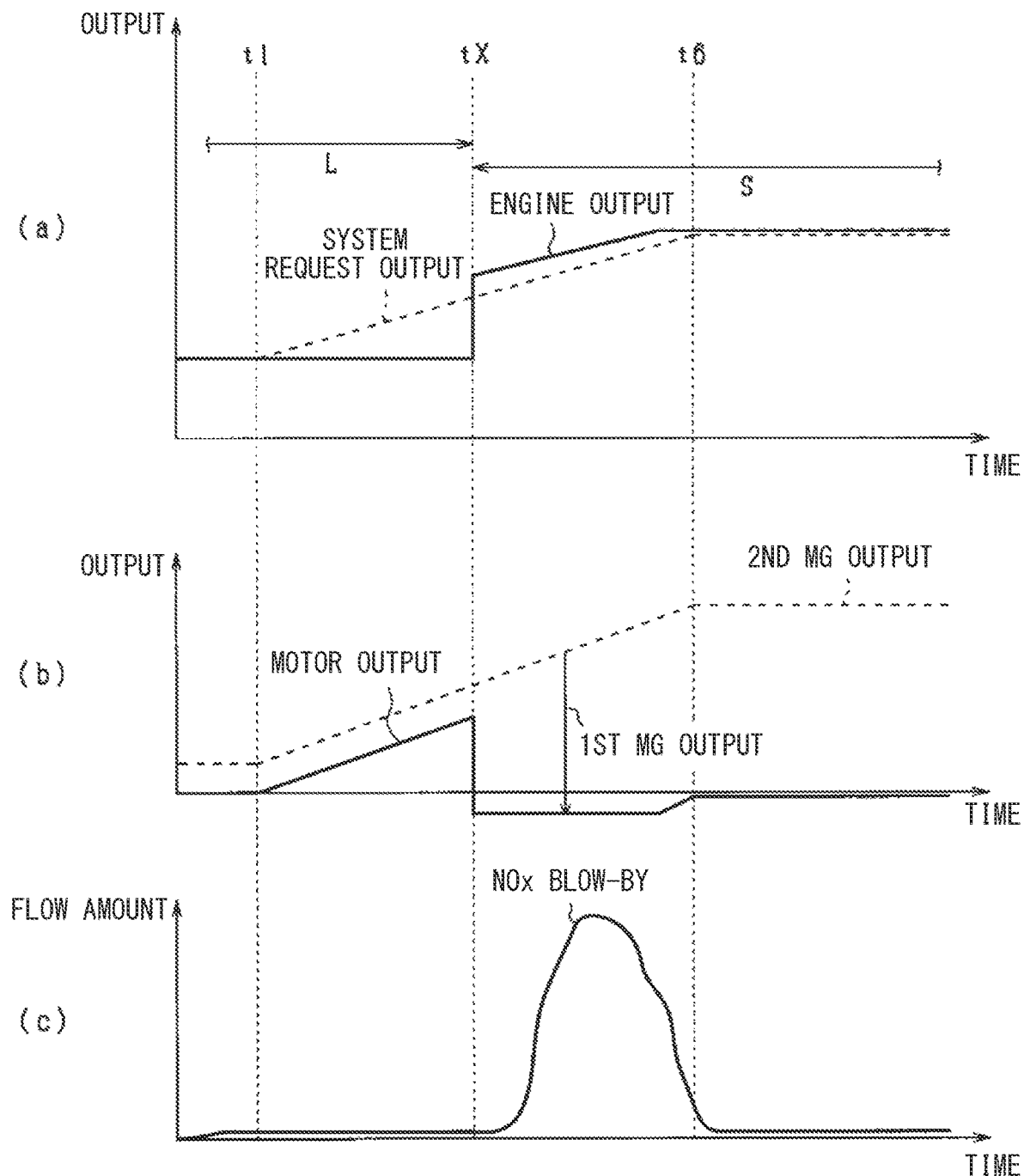

CONTROL DEVICE FOR HYBRID SYSTEM

CROSS REFERENCE TO RELATED APPLICATIONS

The present application is a continuation application of International Patent Application No. PCT/JP2022/019297 filed on Apr. 28, 2022, which designated the U.S. and claims the benefit of priority from Japanese Patent Application No. 2021-080567 filed on May 11, 2021. The entire disclosures of all of the above applications are incorporated herein by reference.

TECHNICAL FIELD

The present disclosure relates to a control device that controls a hybrid system having an engine and a motor.

BACKGROUND

As a document showing a hybrid system, for example, there is a conceivable technique. Some hybrid systems have a three-way catalyst in the exhaust system of the engine.

SUMMARY

According to an example, when switching an operation state of an engine in a hybrid system from a lean burn operation to a stoichiometry operation, the lean burn operation is once switched to a rich operation and then switched to the stoichiometry operation. During a period from before switching to the rich operation to after switching to the rich operation, an intake air restriction for restricting an amount of intake air to the engine is performed. As a result, the amount of intake air is made smaller than when the intake air restriction is not performed. Further, during the period in which the intake air restriction is performed before switching to the rich operation, a fuel cut for cutting fuel to the engine is performed.

BRIEF DESCRIPTION OF THE DRAWINGS

The above and other objects, features and advantages of the present disclosure will become more apparent from the following detailed description made with reference to the accompanying drawings. In the drawings:

FIG. 9 is a time chart showing the same transition of each value as in FIG. 8 in a comparison example.

DETAILED DESCRIPTION

Figure 1:
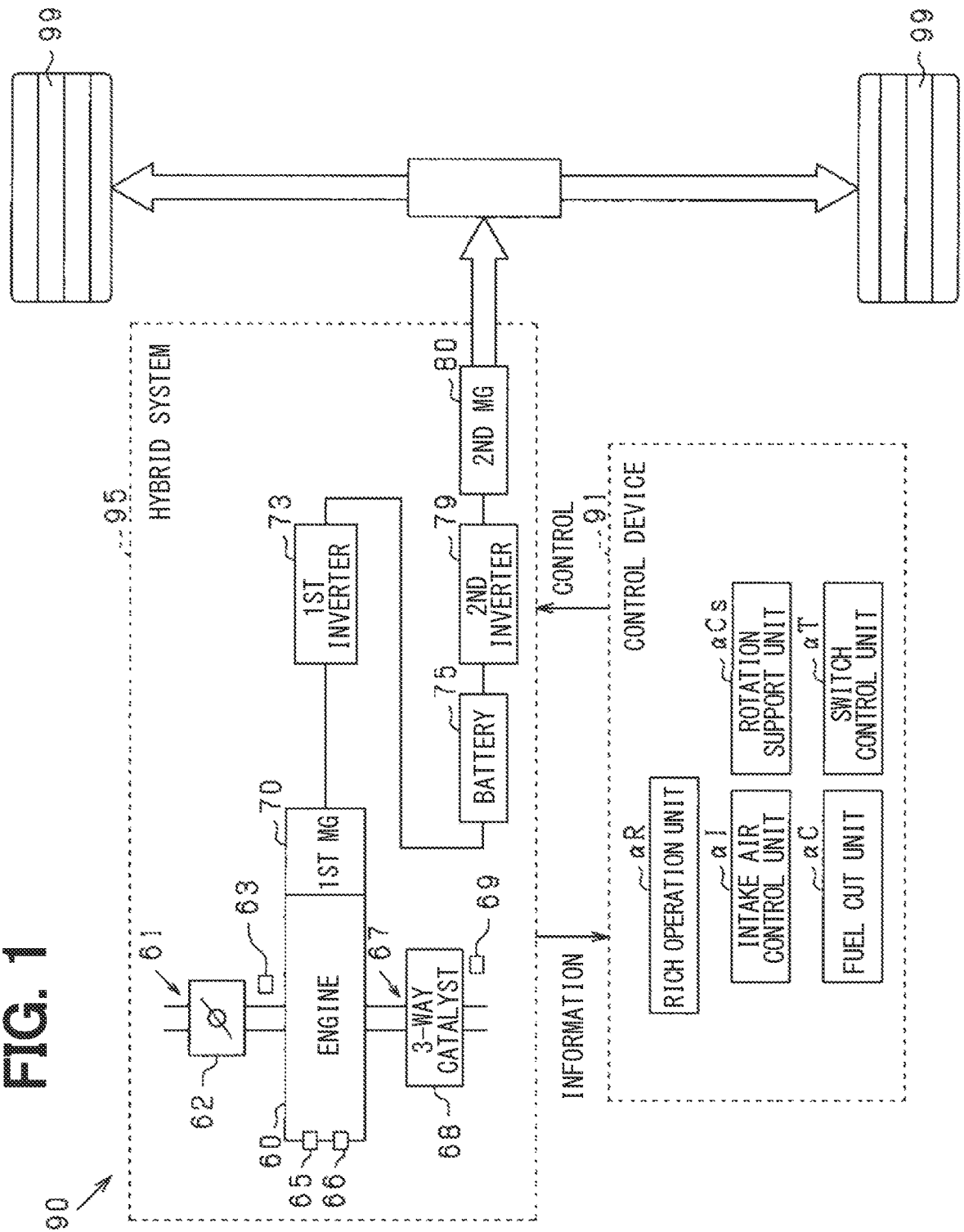
FIG. 1 is a block diagram showing a control device and a hybrid system according to the present embodiment.

In a hybrid system having such a three-way catalyst, from the viewpoint of fuel efficiency, and the like, the present disclosure applicants have considered that the operating state of the engine should be basically a lean burn operation, and switched to a stoichiometry operation only when the output is insufficient. However, in that case, attention was paid to the fact that the following difficulties may occur.

That is, one of the functions of the three-way catalyst is to purify nitrogen oxides, but the purification function deteriorates when oxygen is supplied to the three-way catalyst. On the other hand, in the lean burn operation, oxygen is included in the exhaust gas because the amount of air is greater than the stoichiometry air-fuel ratio. The oxygen in the exhaust gas may deteriorate the function of the three-way catalyst. Here, even in this case, since the generated amount of NOx is small during the lean burn operation period, the exhausted amount of NOx can be suppressed to the legal regulation value or less even if the purification rate is low.

However, immediately after the lean burn operation is switched to the stoichiometry operation, a large amount of NOx generated by the started stoichiometry operation is blown into the three-way catalyst in a state where the function of the three-way catalyst is deteriorated due to the oxygen generated by the lean burn operation up to that point. Therefore, a large amount of NOx blows through the three-way catalyst without being purified by the three-way catalyst. Hereinafter, such the blow of NOx through the three-way catalyst is referred to as "NOx blow-by".

The present embodiments have been made in view of the above circumstances, and a main object of the present embodiments is to suppress the blow-by of NOx immediately after switching from the lean burn operation to the stoichiometry operation.

A control device of the present embodiments controls a hybrid system. The hybrid system has an engine and a motor, has a three-way catalyst in an exhaust system of the engine, and drives a drive target by at least the motor. The control device has a rich operation unit, an intake air restriction unit, and a fuel cut unit, which will be described below.

When switching the operating state of the engine from a lean burn operation to a stoichiometry operation, the rich drive unit once switches from the lean burn operation to the rich operation and then switches to the stoichiometry operation. The intake air restriction unit restricts the intake air amount to the engine during a period from before to after switching to the rich operation, thereby reducing the intake air amount compared to the case where the intake air restriction is not performed. The fuel cut unit cuts the fuel of the engine during the intake air restriction period before switching to the rich operation.

According to the present embodiments, once the lean burn operation is switched to the rich operation, and then, the operation is switched to the stoichiometry operation. Therefore, the oxygen in the three-way catalyst can be reduced by the fuel included in the exhaust gas during the rich operation period, and the NOx purification function of the three-way catalyst can be recovered. Therefore, the blow-by of NOx can be suppressed during the stoichiometry operation after the rich operation.

Moreover, the intake air is limited during the period from before to after switching to the rich operation. Therefore, the amount of NOx generated in the rich operation can be suppressed as compared with the case of switching to the rich operation in the state where the intake air amount is large without restricting the intake air. Therefore, the blow-by of NOx can be suppressed even during the period in which the rich operation is performed.

Moreover, the fuel cut is performed during the intake restriction execution period before the rich operation is performed. This avoids the following difficulties. That is, if the fuel injection amount is maintained without executing a fuel cut during the execution period of the intake air restriction, the emission amount of NOx may be increased since the combustion in the lean burn operation is shifted to the rich operation side according to the intake air restriction. On the other hand, if the fuel injection amount is reduced in order to maintain the air-fuel ratio in the lean burn operation during the intake air restriction execution period, the combustion in the lean burn operation may become unstable. In this regard, in the present disclosure, since the fuel cut is performed in this way, the combustion itself in the engine can be stopped. Therefore, there is no possibility that the combustion will become unstable.

As described above, according to the present embodiment, the blow-by of NOx can be suppressed without destabilizing the combustion.

Embodiments of the present disclosure will now be described with reference to the drawings. It is noted that, the present disclosure is not limited to the embodiments and may be implemented with appropriate modification without departing from the aspect of the disclosure.

FIG. 1 is a block diagram showing a control device 91 and a hybrid system 95 as a control target of the control device 91 according to the present embodiment. A vehicle 90 is equipped with the hybrid system 95 and the control device 91.

First, the hybrid system 95 will be explained. The hybrid system 95 has an engine 60, a first MG 70, a first inverter 73, a battery 75, a second inverter 79 and a second MG 80. The first inverter 73 and the second inverter 79 may be one common inverter.

The battery 75 is a lithium ion battery or the like, and is electrically connected to the first MG 70 and the second MG 80. Below, the charge rate of the battery 75 is defined as "SOC." The second inverter 79 is provided between the battery 75 and the second MG 80 and performs electric power conversion (i.e., DC-AC conversion) therebetween. The second MG 80 drives the wheels 99 with electric power supplied from the battery 75 via the second inverter 79 during power running. On the other hand, during regeneration, the rotation force transmitted from the wheels 99 generates electric power to charge the battery 75 via the second inverter 79.

The engine 60 drives the first MG 70 of the vehicle 90. Note that in the present embodiment, the vehicle 90 is driven only by a torque from the second MG 80, and all torque from the engine 60 is absorbed by the first MG 70. That is, the engine 60 is used only for driving the first MG 70. The first inverter 73 is provided between the battery 75 and the first MG 70 and performs electric power conversion (i.e., AC-DC conversion) therebetween. The first MG 70 is driven by the engine 60 to generate electric power to charge the battery 75 via the first inverter 73, and conversely, the electric power supplied from the battery 75 via the first inverter 73 is used to drive the engine 60.

For the engine 60, an intake system 61 that intakes gas into the engine 60, an injector 65 that injects fuel into the intake system 61 or into the engine 60, a spark plug 66 that ignites the fuel in the engine 60, an exhaust system 67 that discharges gas in the engine 60 are provided.

The intake system 61 is provided with, in order from the upstream side, a throttle valve 62 for adjusting the amount of intake air and an intake air pressure sensor 63 for detecting the air pressure in the intake air system 61. The intake air pressure sensor 63 detects, for example, the air pressure in the intake manifold. Here, instead of using the intake air pressure sensor 63, the control device 91 may estimate the intake air pressure from changes in the rotational speed, torque, and the like of the engine 60.

The exhaust system 67 is provided with a three-way catalyst 68 for promoting the decomposition of carbon monoxide, hydrocarbons, and nitrogen oxides to purify them. The three-way catalyst 68 becomes active as the temperature rises, increasing the purification rate. In addition, when the three-way catalyst 68 is blown with oxygen, the performance of removing nitrogen oxides is lowered. Hereinafter, the temperature of the three-way catalyst 68 is simply referred to as "catalyst temperature". The catalyst temperature is detected by the catalyst temperature detection unit 69. The catalyst temperature detection unit 69 may estimate the catalyst temperature from the temperature of the engine 60, operating conditions, its history, and the like, or may have a catalyst temperature sensor for measuring the catalyst temperature.

Hereinafter, the output of engine 60 is referred to as "engine output", the output of the first MG 70 is referred to as "a first MG output", and the output of the second MG 80 is referred to as "a second MG output". Note that the first MG output is negative when the first MG 70 is generating electric power, and the second MG output is negative when the second MG 80 is generating electric power.

Also, hereinafter, the sum of the first MG output and the second MG output will be referred to as "motor output", and the sum of the motor output and engine output will be referred to as "system output". Therefore, the system output is the output of the entire hybrid system. Further, hereinafter, the request value of the system output will be referred to as "system request output", the request value of the engine output will be referred to as "engine request output", and the request value of the second MG output will be referred to as "second MG request output".

The control device 91 is an ECU (i.e., electronic control unit) having a CPU, a ROM, a RAM, and the like. The control device 91 acquires various information from the hybrid system 95 and the vehicle 90, and controls the hybrid system 95 based on the information. The control device 91 basically controls the operating state of the engine 60 to the lean burn operation L from the viewpoint of fuel consumption and the like, and switches to the stoichiometry operation S only when the system output is insufficient. Note that the lean burn operation L is an operation in which the combustion is performed in a state in which the air is greater than the stoichiometry air-fuel ratio, and the stoichiometry operation S is an operation in which the combustion is performed at the stoichiometry air-fuel ratio.

Next, the difficulty to be solved by this embodiment and the outline of the means for solving the difficulty will be described. In the lean burn operation L, oxygen is included in the exhaust gas because the amount of air is greater than the stoichiometry air-fuel ratio. The oxygen in the exhaust reduces the nitrogen oxide purification performance of the three-way catalyst 68. Here, even in that case, since the generated amount of NOx is small during the lean burn operation L, the amount of exhausted NOx can be suppressed to the regal regulation value or less.

However, immediately after the lean burn operation I is switched to the stoichiometry operation S, a large amount of NOx generated by the started stoichiometry operation S is blown into the three-way catalyst 68 in a state where the activity of the three-way catalyst 68 is deteriorated due to the oxygen generated by the lean burn operation L up to that point. Therefore, a large amount of NOx is not purified by the three-way catalyst 68, and the blow-by of NOx that blows through the three-way catalyst 68 as it is occurs.

Therefore, the control device 91 performs NOx reduction control (i.e., I, C, Cs, R) for reducing NOx emissions from the state of the lean burn operation L on condition that predetermined requirements are satisfied, and then, switches to stoichiometry operation S.

Next, a configuration for executing the NOx reduction control (i.e., I, C, Cs, R) will be described. The control device 91 has a rich operation unit αR, an intake air restriction unit αI, a fuel cut unit αC, a rotation support unit αCs, and a switching control unit αT as the configuration.

When it is necessary to switch the operating state of the engine 60 from the lean burn operation L to the stoichiometry operation S, the rich operation unit αR first switches from the lean burn operation L to the rich operation R and then switches to the stoichiometry operation S. The rich operation R is an operation in which the fuel is burned in a state in which the fuel is more than the stoichiometry air-fuel ratio. The intake air restriction unit αI implements intake air restriction I for restricting the intake air amount to the engine 60, thereby making the intake air amount smaller than when the intake air restriction I is not performed.

The fuel cut unit αC performs a fuel cut C on the engine 60 during the period during which the intake air restriction I is performed before the rich operation R is performed. The rotation support unit αCs performs rotation support control Cs for supporting the rotation of the engine 60 by the first MG 70 during the execution period of the fuel cut C, thereby suppressing the reduction of the rotation speed of the engine 60 compared to when rotation support control Cs is not performed.

Hereinafter, the fuel cut C and the rotation support control Cs described above are collectively referred to as "fuel cut, and the like (i.e., C, Cs)". The electric power required during the execution period of the fuel cut C is referred to as "fuel cut electric power". In other words, during the execution period of the fuel cut C, it is necessary to compensate all of the system request output with the motor output. The electric power required for this is the electric power at the time of the fuel cut C. Therefore, the fuel cut electric power increases as the system request output increases.

The switch control unit αT performs a switch control T for changing the switching timing from the lean burn operation L to the stoichiometry operation S based on the SOC of the battery 75, the acceleration of the vehicle 90, and the speed of the vehicle 90 As a result, the operating state of the engine 60 is switched from the lean burn operation L to the stoichiometry operation S before the system request output rises to the point where it becomes impossible to supply the fuel cut electric power.

Specifically, the switch control unit αT makes it easier and earlier to switch from the lean burn operation L to the stoichiometry operation S in a case where the SOC of the battery 75 is smaller than the predetermined charge threshold, compared with the case where the SOC is greater than the predetermined charge threshold. Further, the switch control unit αT makes it easier and earlier to switch from the lean burn operation L to the stoichiometry operation S in a case where the acceleration of the vehicle 90 is greater than the predetermined threshold acceleration, compared with a case where the acceleration is less than the predetermined threshold acceleration. Further, the switch control unit αT makes it easier and earlier to switch from the lean burn operation L to the stoichiometry operation S in a case where the speed of the vehicle 90 is greater than the predetermined threshold speed, compared with a case where the speed is less than the predetermined threshold speed.

Figure 2:
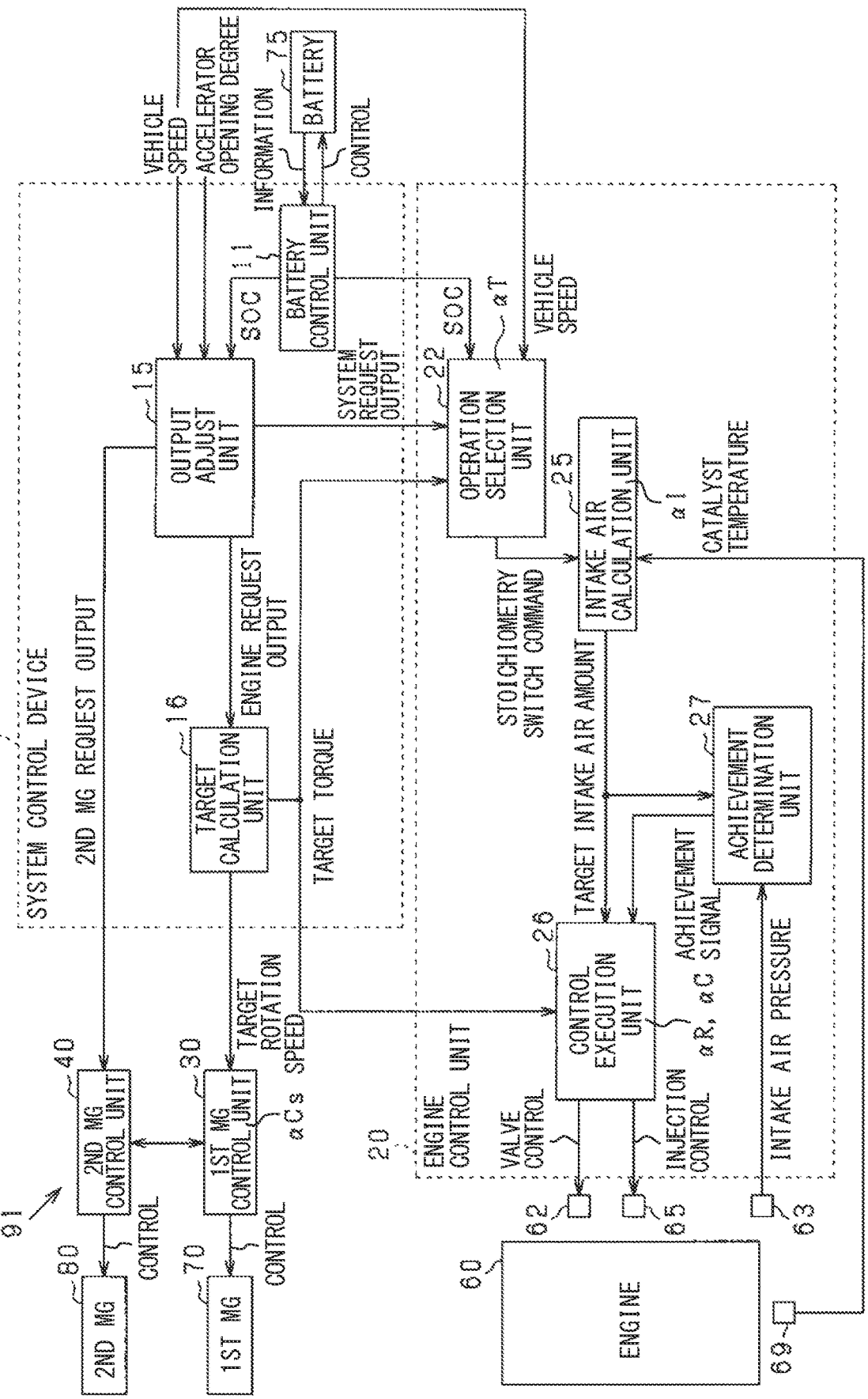
FIG. 2 is a block diagram showing the control device.

FIG. 2 is a block diagram showing the control device 91 divided into functional blocks from a viewpoint different from that of FIG. 1. The control device 91 includes a system control unit 10 that controls the entire hybrid system 95, an engine control unit 20 that controls the engine 60, a first MG control unit 30 that controls the first MG 70, and a second MG control unit th40 at controls the second MG 80.

The system control unit 10 has a battery control unit 11, an output adjustment unit 15 and a target calculation unit 16. The battery control unit 11 acquires battery information such as battery voltage, battery temperature, and battery state from the battery 75, and calculates the SOC based on the battery information.

The output adjustment unit 15 acquires vehicle speed, accelerator opening degree, SOC, and the like, and calculates the system request output, the engine request output, and the second MG request output based on these information. The second MG control unit 40 controls the second MG 80 by controlling the second inverter 79 based on the second MG request output.

The target calculation unit 16 calculates a target rotational speed and a target torque of the engine 60 based on the engine request output. The first MG control unit 30 controls the first MG 70 based on the target rotational speed. Specifically, the first MG control unit 30 feedback-controls the power generation load of the first MG 70 so that the rotation speed of the engine 60 becomes the target rotation speed. Furthermore, the first MG control unit 30 drives the engine 60 by the first MG 70 when the rotation speed of the engine 60 cannot be controlled to the target rotation speed even if the power generation load of the first MG 70 is zero.

The engine control unit 20 has a control execution unit 26. During the lean burn operation L and the stoichiometry operation S, the control execution unit 26 controls the engine 60 by controlling the throttle valve 62, the injector 65, and the like based on the target torque calculated by the target calculation unit 16.

Next, the switching from the lean burn operation L to the stoichiometry operation S by the engine control unit 20 and the like will be described. The engine control unit 20 further has an operation selection unit 22, an intake air calculation unit 25 and an achievement determination unit 27.

The operation selection unit 22 selects whether the operating state of the engine 60 is controlled to be the lean operation L or the stoichiometry operation S based on various information such as the SOC, the system request output, the target torque, the vehicle speed, and the acceleration. Specifically, as described above, the lean burn operation L is basically selected, but the stoichiometry operation S is selected when the system output is insufficient. Then, the operation selection unit 22 changes the selection condition for selecting the stoichiometry operation S based on the SOC, the acceleration of the vehicle 90 and the speed of the vehicle 90. Thereby, the switching control T described above is performed. Therefore, the above-described switch control unit αT is prepared with the operation selection unit 22 as a main body.

The acceleration may be calculated, for example, from system request output (i.e., the accelerator opening degree and the like), may be calculated from changes in vehicle speed over time, or may be calculated from changes in the number of revolutions of the engine 60, the first MG 70, or the second MG 80 over time, and the like. Further, the operation selection unit 22 may select the lean burn operation L or the stoichiometry operation S based on OSC (i.e., oxygen storage capacity) and OBD (i.e., on-board self-diagnosis). The operation selection unit 22 issues a stoichiometry switching command when the selection of the operating state is switched from the lean burn operation L to the stoichiometry operation S.

Upon receiving the stoichiometry switching command from the operation selection unit 22, the intake air calculation unit 25 calculates a target intake air amount to be achieved by the intake air restriction I so that the air intake restriction I is performed. Therefore, the intake air restriction unit αI described above is prepared mainly by the intake air calculation unit 25. At this time, the intake air calculation unit 25 calculates the target intake air amount to be higher to reduce the range of decrease in the intake air amount due to the intake restriction I because the activity of the three-way catalyst 68 is higher when the catalyst temperature is higher than the predetermined temperature than when the catalyst temperature is lower than the predetermined temperature.

Upon receiving the target intake air amount from the intake air calculation unit 25, the control execution unit 26 executes the intake air restriction I by narrowing the opening degree of the throttle valve 62 based on the target intake air amount. Alternatively or additionally, however, the intake air restriction I may be executed by changing cam timing, for example. Further, for example, if the engine 60 has a turbocharger, the intake air restriction I may be executed by increasing the opening degree of the air bypass valve and the opening degree of the exhaust bypass valve.

Further, the control execution unit 26 stops the fuel injection of the injector 65 so that the fuel cut C is started at the same time as the intake air restriction I is started. Due to the fuel cut C, the combustion in the engine 60 is stopped. Therefore, the above-described fuel cut unit αC is prepared mainly with this control execution unit 26.

When the combustion in the engine 60 stops, the engine output decreases. At this time, in the feedback control, the first MG control unit 30 stops electric power generation by the first MG 70 and drives the engine 60 by the first MG 70 in order to maintain the target rotational speed. As a result, the motor output increases, and the rotation support control Cs is started. Therefore, the rotation support control Cs described above is mainly prepared based on the first MG control unit 30.

The achievement determination unit 27 determines whether the intake air amount has decreased to the target intake air amount based on the target intake air amount received from the intake air calculation unit 25 and the intake air pressure received from the intake air pressure sensor 63. When it is determined that the intake air amount has decreased to the target intake air amount, an achievement signal is transmitted.

Upon receiving the achievement signal, the control execution unit 26 cancels the fuel cut C by restarting the fuel injection by the injector 65. Thus, the combustion in the engine 60 is thereby restarted. At this time, the control execution unit 26 switches to the rich operation R by controlling the fuel injection amount of the injector 65 to exceed the stoichiometry air-fuel ratio while maintaining the intake air restriction I. Therefore, the above-described rich operation unit αR is prepared mainly by this control execution unit 26.

The start of the rich operation R increases the engine output. The feedback control reduces the output of the first MG 70 by the amount of the increase of the engine output, and furthermore, it enters the electric power generation state. Thereby, the rotation support control Cs is canceled. After that, the control execution unit 26 cancels the intake air restriction I, and then switches to the stoichiometry operation S by controlling the fuel injection amount of the injector 65 to the stoichiometry air-fuel ratio.

Figure 3:
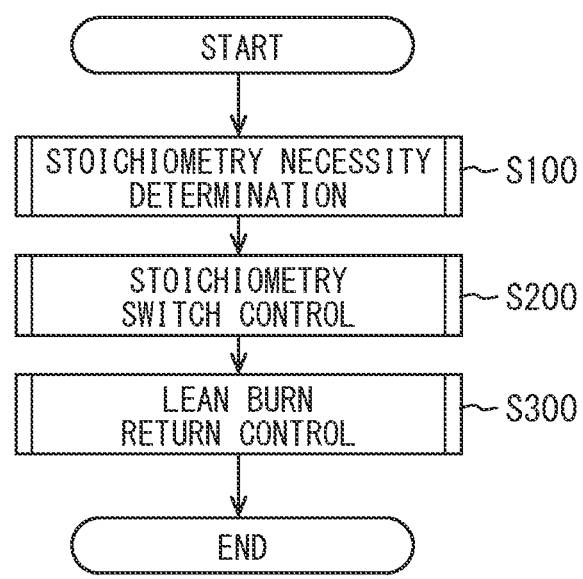
FIG. 3 is a flowchart showing a switching of operation states.

FIG. 3 is a flow chart showing the above NOx reduction control (i.e., I, C, Cs, R) and the like. First, in S100, it is determined whether or not the operating state of the engine 60 needs to be switched from the lean burn operation L to the stoichiometry operation S. When it is determined that the switching to the stoichiometry operation S is necessary in the stoichiometry necessity determination, the stoichiometry switching control is performed in the following S200. In the following S300, the lean burn recovery control (at S300) is performed under the condition that the stoichiometry operation S is being performed. The above flow is repeatedly performed, for example, at a predetermined cycle.

Figure 4:
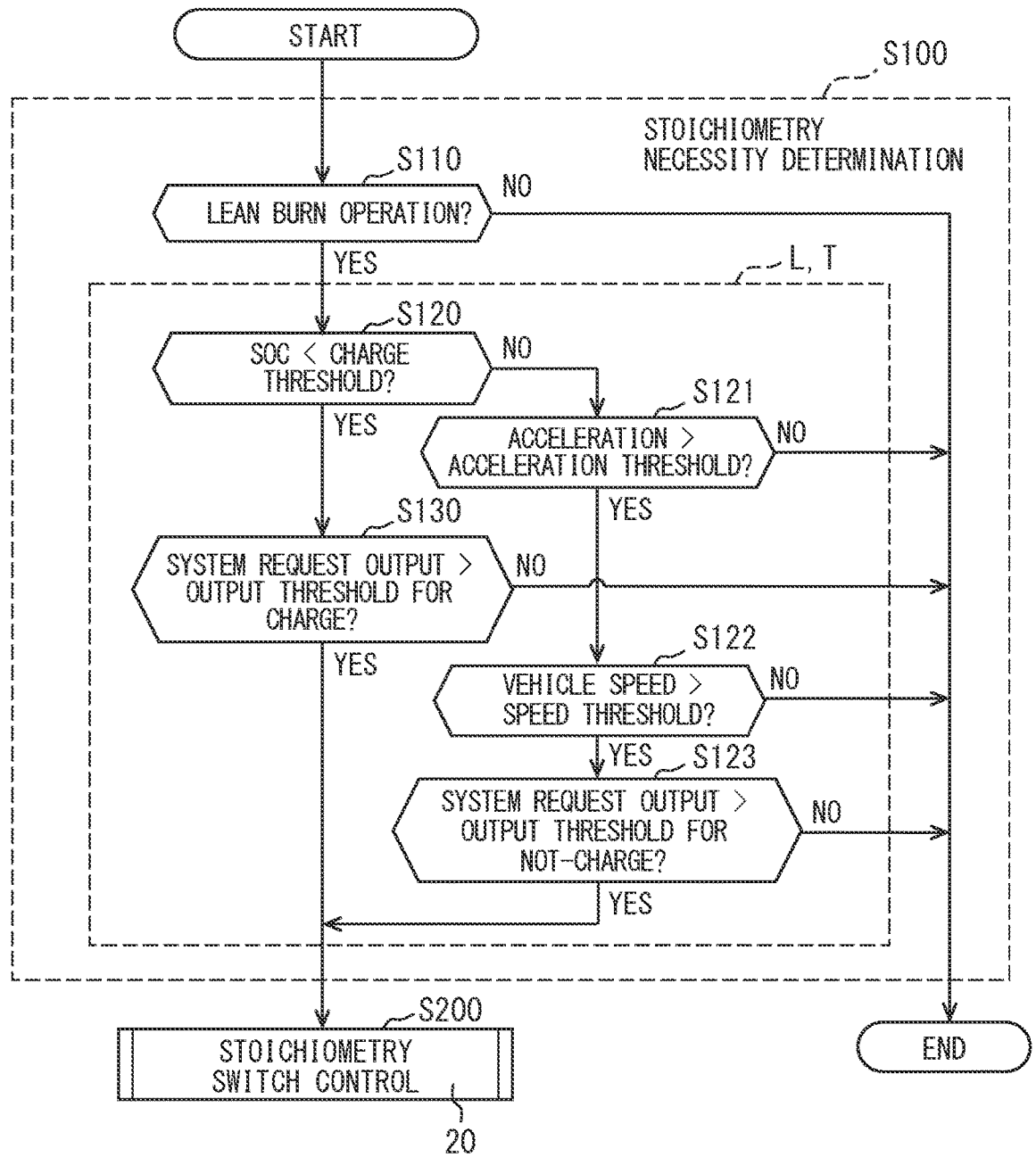
FIG. 4 is a flow chart showing a stoichiometry necessity determination.

FIG. 4 is a flowchart showing the details of the stoichiometry necessity determination (at S100) shown in FIG. 3. In this stoichiometry necessity determination (at S100), first, in S110, it is determined whether the lean burn operation L is being performed. If it is determined that the lean burn operation L is not being performed ("NO" at S110), it is determined that the switching to the stoichiometry operation S is not necessary, and the flow ends. On the other hand, when it is determined in S110 that the lean burn operation L is being performed ("YES" at S110), the process proceeds to S120 to perform the switching control T described above.

At S120, it is determined whether the SOC is smaller than the charge threshold. If it is determined that the SOC is smaller than the charge threshold ("YES" at S120), it is necessary to satisfy the system request output while charging the battery 75, so the process proceeds to S130. In S130, it is determined whether or not the system request output is greater than the threshold output for charging. This threshold output for charging is smaller than the threshold output for not-charging, which will be described later. If it is determined that the system request output is greater than the small threshold output for charging ("YES" at S130), it is assumed that there is a possibility that the system request output cannot be satisfied while charging in the lean burn operation L, so that it proceeds to S200, and then, the process shifts to the stoichiometry switch control (at S200). Therefore, during the charging, the transition to the stoichiometry switch control (at S200) is made earlier than during the non-charging. This threshold output during the charging is set to a magnitude that can be exceeded before the system request output rises to the point where the power supply during the fuel cut is disabled.

On the other hand, when it is determined in S130 that the system request output is smaller than the threshold output for charging ("NO" at S130), the system request output can be satisfied while charging in the lean burn operation L, so that the flow ends without shifting to the stoichiometry switch control (at S200).

On the other hand, in retroactive S120, if it is determined that the SOC is greater than the threshold for charging ("NO" at S120), the process proceeds to S121 assuming that the charging is unnecessary. At S121, it is determined whether or not the acceleration of the vehicle 90 is greater than the threshold acceleration. If it is determined that the acceleration of the vehicle 90 is less than the threshold acceleration ("NO" at S121), the flow ends without shifting to the stoichiometry switch control (at S200) since the system request output can be satisfied even in the lean burn operation L. On the other hand, if it is determined in S121 that the acceleration is greater than the threshold acceleration ("YES" at S121), the process proceeds to S122.

At S122, it is determined whether or not the speed of the vehicle 90 is greater than the threshold speed. If it is determined that the speed is lower than the threshold speed ("NO" at S122), the possibility is low such that the state with the high system request output will continue for a long period of time, so the flow ends without shifting to the stoichiometry switch control (at S200). On the other hand, when it is determined in S122 that the speed of the vehicle 90 is higher than the threshold speed ("YES" at S122), the process proceeds to the next S123.

In S123, it is determined whether or not the system request output is greater than the threshold output during non-charging which is greater than the threshold output during charging. If it is determined that the system request output is greater than the threshold output during non-charging ("YES" at S123), there is a possibility that the system request output cannot be satisfied in the lean burn operation L, and the process proceeds to S200 to perform the stoichiometry switch control. On the other hand, when it is determined in S123 that the system request output is smaller than the threshold output for not-charging ("NO" at S123), the system request output can be satisfied in the lean burn operation L, so that the flow ends without shifting to the stoichiometry switch control (at S200).

Therefore, when the acceleration of the vehicle 90 is greater than the threshold acceleration ("YES" at S121) and the speed of the vehicle 90 is greater than the threshold speed ("YES" at S122), the flow shifts to the stoichiometry switch control (at S200) earlier than other cases. This threshold output during the not-charging is set to a magnitude that can be exceeded before the system request output rises to the point where the power supply during the fuel cut is disabled.

Next, the predetermined steps S121, S122, and S123 in the stoichiometry necessity determination (at S100) described above will be additionally described. In determining the acceleration in S121, it is possible to determine whether or not the vehicle is travelling uphill, and if it is determined that the vehicle is travelling uphill, the threshold acceleration may be lowered. As a result, even with the same acceleration, it is possible to switch to the stoichiometry operation S more quickly when travelling uphill.

Further, in determining the vehicle speed in S122, for example, the threshold speed may be decreased as the acceleration increases. Thereby, even if the vehicle speed is the same, the higher the acceleration, the earlier the switch to the stoichiometry operation S can be made. Also in S122, as in the case of S121, the uphill determination is performed, and if it is determined that the vehicle is travelling uphill, the threshold speed may be lowered. As a result, even with the same speed, it is possible to switch to the stoichiometry operation S more quickly when travelling uphill.

Figure 5:
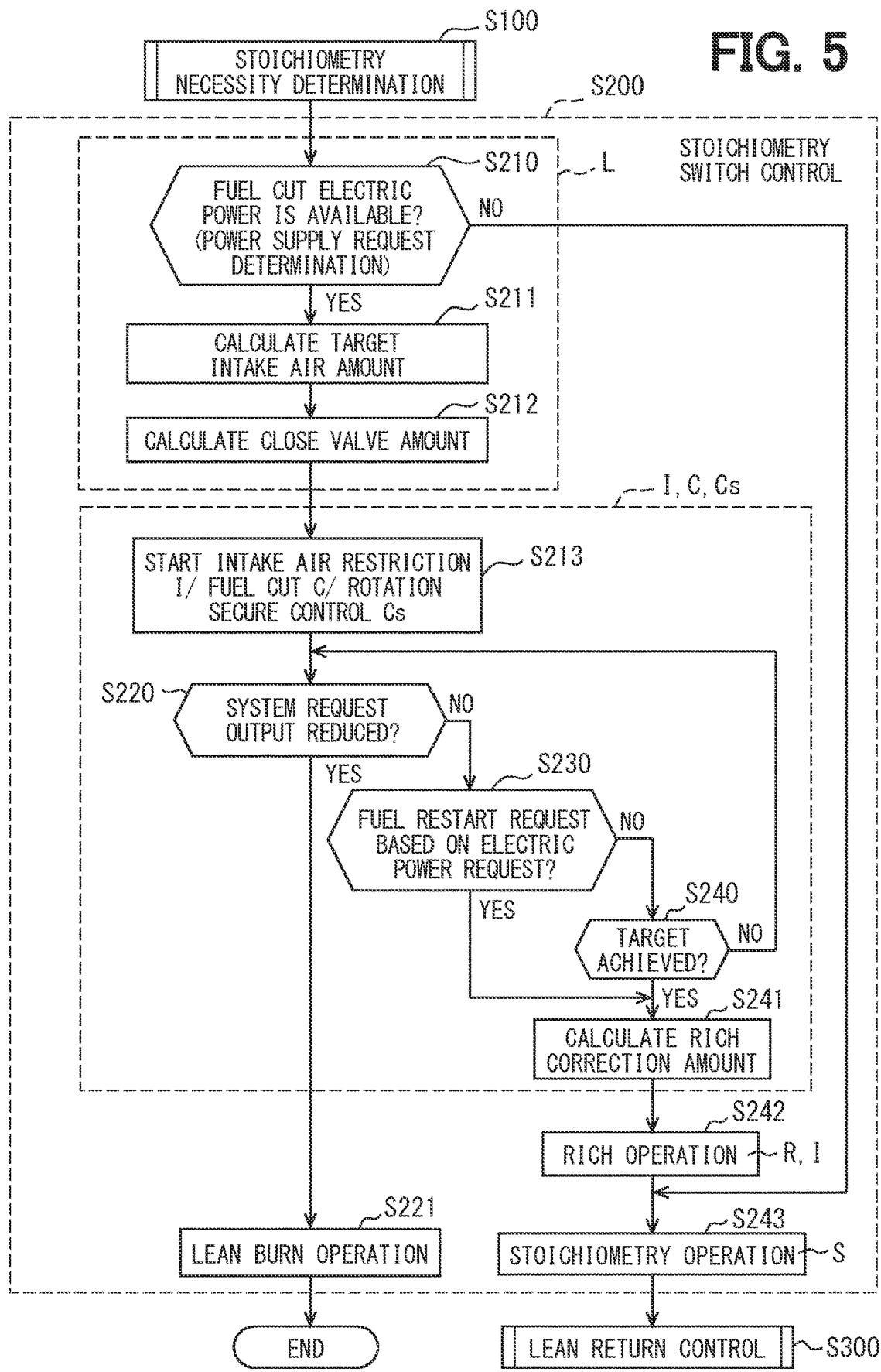
FIG. 5 is a flowchart showing a stoichiometry switching control.

FIG. 5 is a flow chart showing the details of the stoichiometry switch control (at S200) shown in FIGS. 3 and 4. In this stoichiometry switch control (at S200), first, in S210, it is determined whether or not electric power at fuel cut can be supplied. Here, in the stoichiometry necessity determination (at S100), as described above, the flow switches to the stoichiometry switch control (at S200) before the system request output rises to become impossible to supply the electric power during the fuel cut. Therefore, as long as there is no particular reason such as a failure in the hybrid system 95, the determination in S210 is "YES". This power supply availability determination may be performed based on, for example, the SOC and the catalyst temperature, or alternatively or additionally based on whether or not a condition such as sudden acceleration that makes it impossible to supply the necessary electric power is met.

When it is determined in S210 that the electric power during fuel cut cannot be supplied ("NO" at S210), the process proceeds to S243, and the flow switches to the stoichiometry operation S without executing the NOx reduction control (i.e., I, C, Cs, R) from the lean burn operation L state. On the other hand, if it is determined in S210 that the electric power during the fuel cut can be supplied ("YES" at S210), the process proceeds to S211 to perform NOx reduction control (i.e., I, C, Cs, R).

In S211, the target intake air amount for intake air restriction I is calculated. At S212, the control amount for closing the throttle valve 62 is calculated based on the calculated target intake air amount. In the following S213, the intake air restriction I is started by controlling the throttle valve 62 in the closing direction based on the control amount calculated in S212. Furthermore, at this time, the fuel cut C is performed by stopping the fuel injection by the injector 65. Along with this, electric power generation by the first MG 70 is stopped, and the first MG 70 starts driving the engine 60 on the other hand, thereby starting the rotation support control Cs.

In the following S220, it is determined whether or not there is a decrease in the system request output. If it is determined that the system request output has decreased ("YES" at S220), the system request output has decreased during the intake air restriction I and the fuel cut (C, Cs) and the like, and it is no longer necessary to switch to the stoichiometry operation S. Therefore, in S221, the intake air restriction I and the fuel cut (C, Cs) and the like are cancelled, and the lean burn operation L is restarted. On the other hand, when it is determined in S220 that the system request output has not decreased ("NO" at S220), process proceeds to S230.

In S230, it is determined whether or not there is a request to restart combustion due to an electric power request. That is, even if it is determined in S210 that the electric power during the fuel cut can be supplied ("YES" at S210), the electric power may be insufficient due to failure, unexpected electric power consumption, delay in reaching the target intake air amount, or the like. In that case, even if the intake air amount has not decreased to the target intake air amount, it is necessary to immediately cancel the fuel cut C and restart the combustion in the engine 60. Therefore, if it is determined at S230 that there is a request to restart the combustion ("YES" at S230), the process proceeds to S241 to start the rich operation R without waiting for the intake air amount to reach the target intake air amount. On the other hand, when it is determined in S230 that there is no request for restarting the combustion due to the electric power request ("NO" at S230), the process proceeds to S240.

At S240, it is determined whether or not the intake air amount has decreased to the target intake air amount. If it is determined that the intake air amount has not decreased to the target air amount ("NO" at S240), the process returns to S220 to maintain the intake air restriction I. On the other hand, when it is determined in S240 that the intake air amount has decreased to the target air amount ("YES" at S240), the process proceeds to S241.

In S241, a rich correction amount is calculated. The rich correction amount is calculated based on the duration time interval of the rich operation R and the amount of fuel injection, which are required to sufficiently reduce the oxygen adhering to the three-way catalyst 68 due to the lean burn operation L at that time and sufficiently restore the activity of the three-way catalyst 68. In the following S242, while maintaining the intake air restriction I, the fuel cut (i.e., C, Cs) and the like are cancelled, and the rich operation R is started based on the rich correction amount calculated in S241. In the following S243, the intake air restriction I is cancelled, the rich operation R is ended, and the stoichiometric operation S is started. After that, the process proceeds to the lean burn return control in S300.

Figure 6:
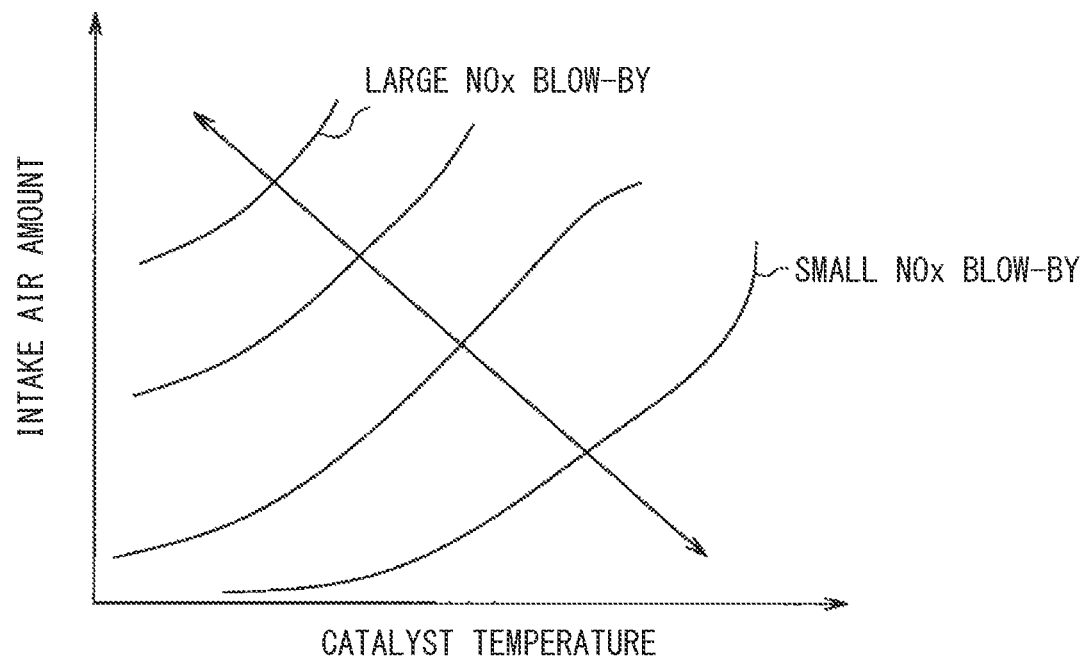
FIG. 6 is a graph showing the relationship between catalyst temperature, intake air amount, and NOx blow-by amount.

Next, the predetermined steps S210 and S211 in the above-described stoichiometry switch control (at S200) will be additionally described. In the calculation of the target intake air amount in S211, as described above, the activity of the three-way catalyst 68 is higher when the catalyst temperature is higher than the predetermined temperature than when the catalyst temperature is lower than the predetermined temperature. thus, the target intake air amount is increased. That is, the higher the catalyst temperature, the greater the amount of NOx that can be purified by the three-way catalyst 68. Therefore, as shown in FIG. 6, the higher the catalyst temperature (corresponding to the horizontal axis), the higher the intake air amount (corresponding to the vertical axis) can be increased if the same blow-by amount (corresponding to the contour line) of NOx is sufficient. Therefore, the higher the catalyst temperature, the smaller the amount of reduction in the intake air amount caused by the intake air restriction I. Therefore, as described above, the higher the catalyst temperature, the larger the target intake air amount.

In addition, in the power supply availability determination in S210, the higher the catalyst temperature, the easier it is to determine that the fuel cut electric power can be supplied. The reasons are described below. As described above, the higher the catalyst temperature (corresponding to the horizontal axis), the smaller the amount of reduction in the intake air caused by the intake air restriction I can be made. Therefore, the arrival time until the intake air amount reaches the target intake air amount can be shortened. The arrival time and the execution period of the fuel cut C match. Therefore, the higher the catalyst temperature, the shorter the period during which the fuel cut C is performed, and the more the electric power consumption during the fuel cut C can be suppressed. Therefore, as described above, the higher the catalyst temperature, the easier it is to determine that the electric power during fuel cut can be supplied. For the same reason as above, the threshold output for charging in S130 and the threshold output for non-charging in S123 are also set higher as the catalyst temperature is higher, so that the switch timing can be delayed.

Figure 7:
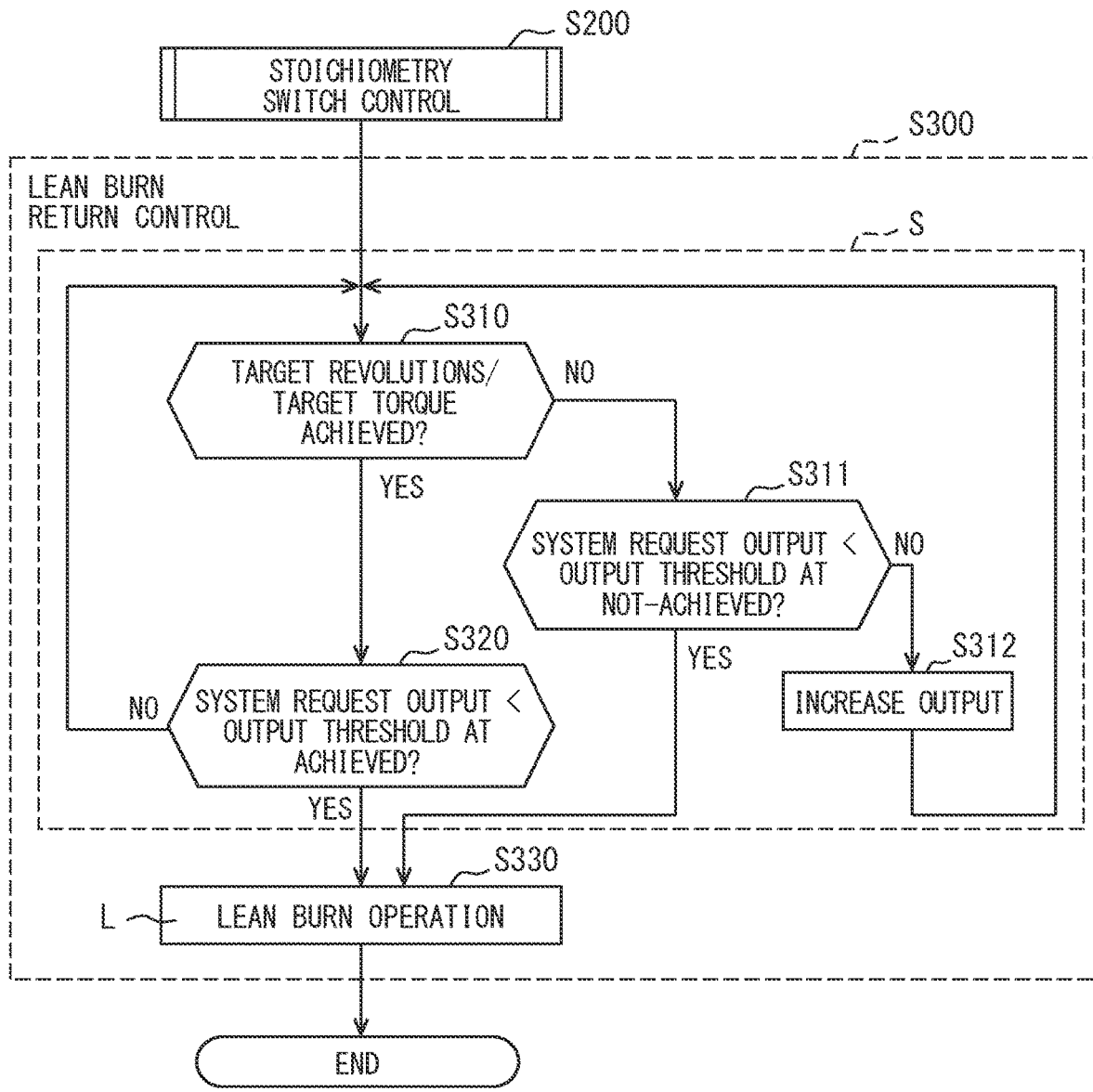
FIG. 7 is a flowchart showing a lean burn return control.

FIG. 7 is a flow chart showing the details of the lean burn recovery control (at S300) shown in FIGS. 3 and 5. In this lean burn return control (at S300), first, in S310, it is determined whether or not the rotational speed and the torque of the engine 60 have reached the target rotational speed and the target torque, respectively. If it is determined that the target rotation speed and the target torque have been reached ("YES" at S310), the process proceeds to S320.

At S320, it is determined whether or not the system request output is less than the arrival threshold output. This threshold output for arrival is greater than the threshold output for non-arrival, which will be described later. When it is determined that the system request output is smaller than the large threshold output for the arrival time ("YES" at S320), it is determined that the system request output can be satisfied even in the lean burn operation L, and the process proceeds to S330, and after returning to the lean burn operation L, the flow ends. Therefore, when the rotational speed and the torque of the engine 60 reach the target rotational speed and the target torque, respectively ("YES" at S310), it is easier to return to the lean burn operation L than in the other case ("NO" at S310). On the other hand, when it is determined in S320 that the system request output is greater than the large threshold output at the time of arrival ("NO" at S320), the process returns to S310 to maintain the stoichiometric operation S.

On the other hand, in retroactive S310, if it is determined that the rotation speed of the engine 60 has not reached the target rotation speed or the torque has not reached the target torque ("NO" at S310), the process proceeds to S311. In S311, it is determined whether or not the system request output is smaller than the small threshold output for non-arrival which is smaller than the threshold output for arrival. When it is determined that the system request output is smaller than the small threshold output for the non-arrival time ("YES" at S311), it is determined that the system request output can be satisfied even in the lean burn operation L, and the process proceeds to S330, and after returning to the lean burn operation L, the flow ends. On the other hand, if it is determined in S311 that the system request output is greater than the small non-arrival threshold output ("NO" at S311), the process proceeds to S312 to increase the output in the current stoichiometry operation S, and then the process returns to S310. Therefore, when it is determined that the target rotation speed has not been reached or the target torque has not been reached ("NO" at S310), it is difficult to return to the lean burn operation L, compared with a case where the target rotation speed has been reached or the target torque has been reached ("YES" at S310).

Figure 8:
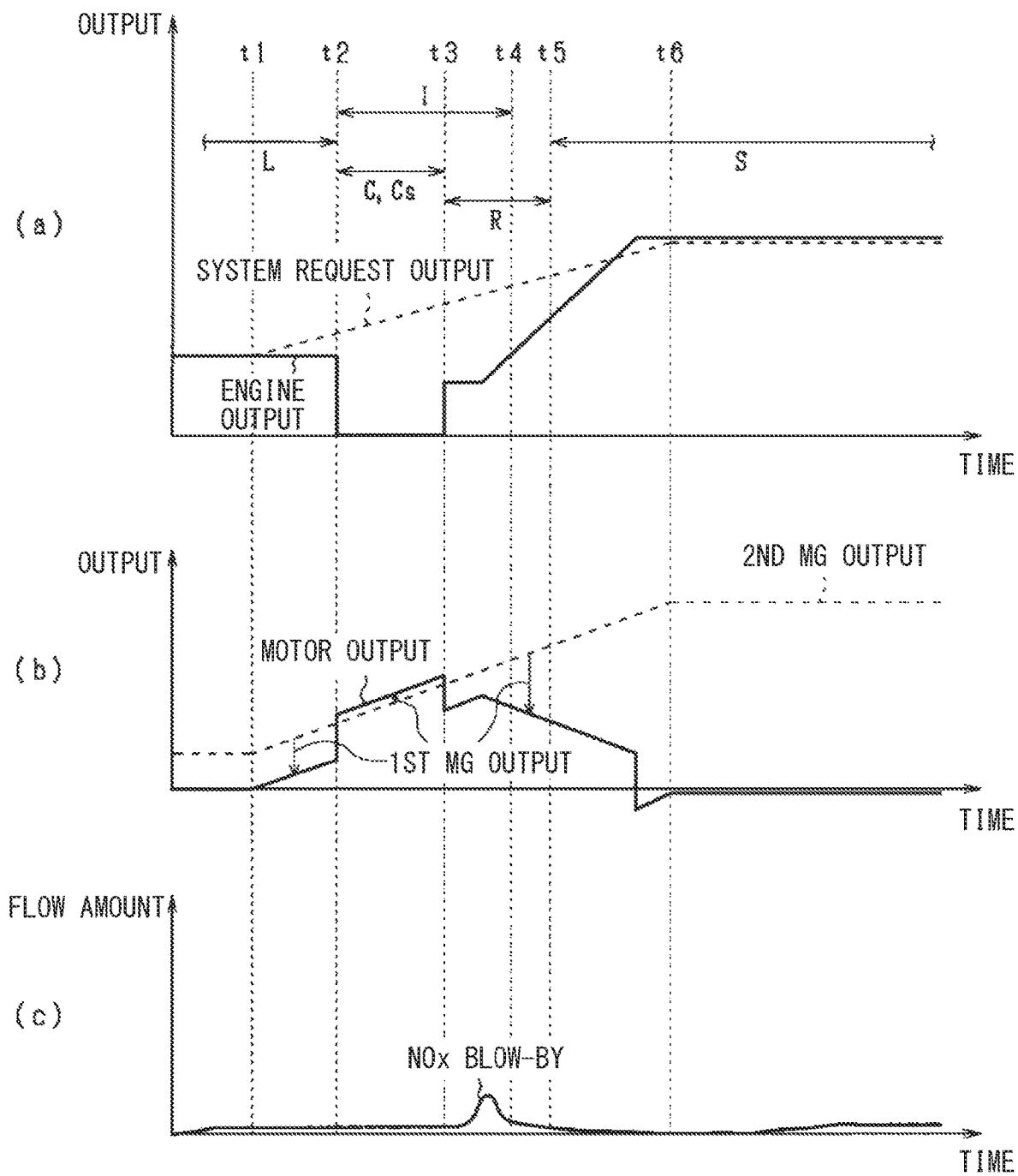
FIG. 8 is a time chart showing the transition of each value when the stoichiometry switching control is performed.

FIG. 8 is a time chart showing an example of transition of each value when the stoichiometry switch control (at S200) shown in FIG. 5 is performed. Six predetermined timings t1 to t6 will be described below in chronological order as "a first timing t1", "a second timing t2", "a third timing t3", "a fourth timing t4", "a fifth timing t5", and "a sixth timing t6".

(a) in FIG. 8 shows transitions of the system request output and the engine output. In this way, it is assumed that the system request output rises between the first timing t1 and the sixth timing t6. Then, it is assumed that the lean burn operation L is performed until the second timing t2. Therefore, until the second timing t2, the engine output is the engine output during the lean burn operation L.

Then, at the second timing t2, it is assumed that the intake air restriction I, the fuel cut (C, Cs) and the like are started. At this second timing t2, the engine output becomes zero. Then, at the third timing t3, it is assumed that the fuel cut or the like (C, Cs) is canceled and the rich operation R is started. Therefore, at this third timing t3, the engine output appears again.

Then, it is assumed that the intake air restriction I is canceled at the fourth timing t4, and the rich operation R is switched to the stoichiometry operation S at the fifth timing t5. After the third timing t3, the engine output increases until just before the sixth timing t6.

(b) in FIG. 8 shows transitions of the motor output and the second MG output. The second MG output increases from the first timing t1 to the sixth timing t6. The motor output is obtained by adding the first MG output to the second MG output. Therefore, the difference between the motor output and the second MG output becomes the first MG output. The motor output is introduced to compensate for the difference between the system request output and the engine output shown in (a) of FIG. 8. The motor output increases during the period (from t2 to t3) from the second timing t2 to the third timing t3 by executing the rotation support control Cs. In particular, the motor output becomes the maximum just before the third timing t3 when the fuel cut C ends. The aforementioned threshold output for charging and threshold output for non-charging are determined so as to satisfy the motor output just before the third timing t3. Then, in the above-described power supply availability determination, it is determined whether or not the motor output just before the third timing t3 can be satisfied.

(c) in FIG. 8 shows transitions in the NOx blow-by amount. Before the second timing t2 (i.e., up to t2), the activity of the three-way catalyst 68 is reduced due to the oxygen included in the exhaust gas during the lean burn operation L, but the amount of NOx generated during the lean burn operation L itself is small. Therefore, before the second timing t2 (i.e., up to t2), even if the purification rate is low, the emission amount of NOx can be suppressed to the regulation value or less, and the blow-by amount of NOx is sufficiently small.

During the subsequent period from the second timing t2 to the third timing t3 (i.e., from t2 to t3), the fuel cut C is performed, so there is no combustion and no NOx is generated. Therefore, the amount of blow-by of NOx is either zero or small. In the subsequent period from the third timing t3 to the fifth timing t5 (i.e., from t3 to t5), since the rich operation R is performed, NOx is generated and the blow-by amount of NOx increases slightly. However, since the intake air restriction I is performed from the second timing t2 before switching to the rich operation R to the fourth timing t4 after switching to the rich operation R, the blow-by amount of NOx in the rich operation R is suppressed to be lower than when the intake air restriction I is not performed. Then, the oxygen in the three-way catalyst 68 is reduced by the fuel included in the exhaust gas during the rich operation R, and the NOx purification rate of the three-way catalyst 68 is restored. Therefore, during the stoichiometric operation S period after the fifth timing t5 (from t5), the blow-by amount of NOx is sufficiently suppressed.

FIG. 9 shows a time chart which shows the comparison example such that without executing the NOx reduction control (i.e., I, C, Cs, R), the lean operation L is switched to the stoichiometry operation S at a predetermined switch timing tX between the first timing t1 and the sixth timing t6. The effects of this embodiment will be described with reference to this comparison example.

In this comparison example, immediately after the switch timing tX, the activity of the three-way catalyst 68 is reduced due to the oxygen generated during the lean burn operation L up to that point. In this state, a large amount of NOx generated by the started stoichiometry operation S blows into the three-way catalyst 68. Therefore, the three-way catalyst 68 cannot purify NOx sufficiently, and the NOx blow-by amount increases immediately after the switch timing tX, as shown in (c) of FIG. 9.

In this regard, in the present embodiment, as shown in (a) of FIG. 8, the lean burn operation L is first switched to the rich operation R and then switched to the stoichiometry operation S. Therefore, the oxygen in the three-way catalyst 68 can be reduced by the fuel included in the exhaust gas during the period (from t3 to t5) during which the rich operation R is performed, and the activity of the three-way catalyst 68 can be restored. Therefore, it is possible to suppress blow-by of NOx during the execution period (from t5) of the stoichiometry operation S after the rich operation R.

Moreover, during the period (from t2 to t4) from before to after switching to the rich operation R, the intake air restriction I is executed. Therefore, the amount of NOx generated in the rich operation R can be suppressed as compared with the case of switching to the rich operation R in the state where the intake air amount is large without executing the intake air restriction I. Therefore, the blow-by of NOx can be suppressed even during the period (from t3 to t5) during which the rich operation R is performed.

Moreover, the fuel cut C is performed during the intake air restriction I execution period (from t2 to t3) before switching to the rich operation R. This avoids the following difficulties. That is, if the fuel injection amount is maintained without executing a fuel cut C during the execution period (from t2 to t3) of the intake air restriction I, the emission amount of NOx may be increased since the combustion in the lean burn operation L is shifted to the rich operation side according to the intake air restriction I. On the other hand, if the fuel injection amount is reduced in order to maintain the air-fuel ratio in the lean burn operation L during the intake air restriction execution period (from t2 to t3), the combustion in the lean burn operation L may become unstable. In this regard, since the fuel cut C is performed in this way, the combustion itself in the engine 60 can be stopped. Therefore, there is no possibility that the combustion will become unstable.

Moreover, the hybrid system 95 drives the vehicle 90 only with the second motor 80. Therefore, even if the output of the engine 60 decreases due to the fuel cut C, the driving output does not decrease. Therefore, it is possible to avoid a sudden drop in the driving output at the start of the fuel cut C (at t2) and a sudden increase in the driving output at the end of the fuel cut C (at t3).

Moreover, the engine 60 is driven by the first MG 70 during the execution period of the fuel cut C (from t2 to t3). Therefore, variations in engine speed and intake air amount after recovery from the fuel cut C can be reduced, and accuracy of injection amount in the rich operation R can be improved.

As described above, according to the present embodiment, the blow-by of NOx can be suppressed without destabilizing combustion, sudden change in driving output, and notably increasing variation in engine speed and intake air amount.

Furthermore, the switch control unit αT facilitates early switching from the lean burn operation L to the stoichiometry operation S when the SOC of the battery 75 is small, the acceleration of the vehicle 90 is large, or the speed of the vehicle 90 is high. As a result, the operating state of the engine 60 is switched from the lean burn operation L to the stoichiometry operation S before the system request output rises to the point where it becomes impossible to supply the fuel cut electric power. Therefore, it is possible to avoid the difficulty of being unable to supply electric power when the fuel is cut.

Further, in the intake air restriction I, the amount of decrease in the intake air amount in the intake air restriction I is made smaller when the catalyst temperature is higher. Therefore, when the catalyst temperature is high and the NOx purifying ability is high, it is possible to avoid a needlessly large decrease in the amount of intake air. To put it the other way around, under the intake air restriction I, when the catalyst temperature is low, the range of decrease in the intake air amount at the intake air restriction I is increased. Therefore, when the catalyst temperature is low and the NOx purifying ability is low, it is possible to avoid the difficulty that NOx emissions cannot be sufficiently suppressed in the rich operation R due to an insufficient amount of decrease in the intake air amount.

Other Embodiments

Each of the embodiments described above can be implemented with the following changes, for example. In the intake air restriction I of the first embodiment, when the catalyst temperature is high, the degree of decrease in the intake air amount is made smaller. Alternatively, the reduction degree of the intake air amount may be fixed.

In the first embodiment, the engine 60 is used only for charging via the first MG 70. Alternatively, the vehicle 90 may be driven by both the engine 60 and the second MG 80. In this case, the vehicle 90 may be driven only by the second MG 80 during the period (from t2 to t3) during which the fuel cut C is performed. Further, during the execution period (from t2 to t3) of the fuel cut C, it may be preferable to perform the output compensation control to increase the driving output of the vehicle 90 by the second MG 80 compared to when the fuel cut C is not executed. This is because the decrease in the driving output due to the fuel cut C can be compensated for by increasing the output of the second MG 80.

In the first embodiment, two motor generators, i.e., the first MG 70 and the second MG 80 are provided. Alternatively, one MG may be provided that provides a combination of the roles of these two MGs, a first clutch is provided between the engine 60 and the MG, and a second clutch is provided between the MG and the wheels 99.

In the rotation support control Cs of the first embodiment, the engine 60 is driven by the first MG 70 during the execution period of the fuel cut C (from t2 to t3). Alternatively, during the execution period (from t2 to t3) of the fuel cut C, the power generation load on the engine 60, that is, the amount of electric power generated by the first MG, may be simply reduced compared to when the fuel cut C is not performed, so that the rotation of the engine 60 may be supported.

In the first embodiment, the rotation support control Cs is performed during the period during which the fuel cut C is performed. Alternatively, the rotation support control Cs may not be performed. In place of or in addition to rotation support control Cs, torque shock may be relieved as follows. That is, by retarding the ignition timing at the end of the fuel cut C, the torque immediately after the end of the fuel cut C is limited. From this state, the torque is gradually increased by gradually advancing the ignition angle and canceling the retarded ignition angle. Also by this, the torque shock at the end of the fuel cut C can be relieved.

In the first embodiment, the switch control unit αT facilitates early switching from the lean burn operation L to the stoichiometry operation S when the SOC (i.e., state of charge) of the battery 75 is small. In place of this SOC (i.e., state of charge), when the amount of charge in the battery 75 is small, the lean burn operation L may be easily switched to the stoichiometry operation S at an early stage.

In the first embodiment, the vehicle 90 is equipped with the hybrid system 95 and the control device 91. Alternatively, the hybrid system 95 and the control device 91 may be mounted on a vehicle other than a car such as a boat.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control device for controlling a hybrid system having an engine and a motor with a three-way catalyst in an exhaust system of the engine, and driving a drive object by at least the motor, the control device comprising:
   a rich operation unit that switches from a lean burn operation to a rich operation once and then switches to a stoichiometry operation when switching an operation state of the engine from the lean burn operation to the stoichiometry operation;
   an intake air restriction unit that performs an intake air restriction for restricting an intake air amount to the engine during a period from before switching to the rich operation to after switching to the rich operation, to reduce the intake air amount compared to a case where the intake air restriction is not performed; and
   a fuel cut unit that performs a fuel cut for stop supplying fuel to the engine while performing the intake air restriction before switching to the rich operation.

2. The control device according to claim 1, wherein:
   the intake air restriction unit reduces a decrease amount of the intake air amount in the intake air restriction when temperature of the three-way catalyst is higher than a predetermined temperature than when the temperature of the three-way catalyst is lower than the predetermined temperature.

3. The control device according to claim 1, further comprising:
   a rotation support unit that performs a rotation support control for supporting a rotation of the engine while performing the fuel cut, to suppress a decrease in a rotational speed of the engine compared to when the rotation support control is not performed.

4. The control device according to claim 3, wherein:
   the rotation support control includes driving the engine by the motor.

5. The control device according to claim 3, wherein:
   the hybrid system further has a generator that generates an electric power by the rotation of the engine; and
   the rotation support control includes reducing a generation load of the electric power by the engine with the generator compared to when the fuel cut is not performed.

6. The control device according to claim 1, wherein:
   the drive object is a vehicle; and a request output for the hybrid system is defined as a system request output, the control device further comprising:

a switch control unit that performs a switch control for changing a switch timing from the lean burn operation to the stoichiometry operation based on at least one of a charge state of a battery for supplying an electric power to the motor, acceleration of the vehicle, and speed of the vehicle, to switch the operation state from the lean burn operation to the stoichiometry operation before the system request output increases to become impossible to supply the electric power necessary for a period for performing the fuel cut.

7. The control device according to claim 1, wherein:

the hybrid system drives the drive object only by the motor out of the engine and the motor.

8. The control device according to claim 1, wherein:

the hybrid system drives the drive object by both the engine and the motor; and while performing the fuel cut, an output compensation control is performed to increase a drive output of the motor to the drive object compared to when the fuel cut is not performed.

9. The control device according to claim 1, further comprising:

one or more processors, wherein:

the one or more processors provide at least: the rich operation unit; the intake air restriction unit; and the fuel cut unit.

* * * * *